United States Patent
Yang et al.

(10) Patent No.: US 11,252,133 B2
(45) Date of Patent: Feb. 15, 2022

(54) METHOD, DEVICE, MEDIUM AND APPARATUS FOR CDN INTER-NODE ENCRYPTION

(71) Applicant: GUIZHOU BAISHANCLOUD TECHNOLOGY CO., LTD., Guiyang (CN)

(72) Inventors: Yang Yang, Beijing (CN); Hui Miao, Beijing (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 195 days.

(21) Appl. No.: 16/484,538

(22) PCT Filed: Feb. 5, 2018

(86) PCT No.: PCT/CN2018/075221
§ 371 (c)(1),
(2) Date: Aug. 8, 2019

(87) PCT Pub. No.: WO2018/145606
PCT Pub. Date: Aug. 16, 2018

(65) Prior Publication Data
US 2020/0059454 A1 Feb. 20, 2020

(30) Foreign Application Priority Data
Feb. 8, 2017 (CN) .......................... 201710069825.2

(51) Int. Cl.
*H04L 29/06* (2006.01)
*H04L 9/08* (2006.01)

(52) U.S. Cl.
CPC ........ *H04L 63/0428* (2013.01); *H04L 9/0822* (2013.01); *H04L 9/0869* (2013.01); *H04L 63/062* (2013.01)

(58) Field of Classification Search
None
See application file for complete search history.

(56) References Cited

U.S. PATENT DOCUMENTS 7,783,777 B1 * 8/2010 Pabla .................. H04L 67/1063
709/238
2002/0154782 A1 10/2002 Chow et al.
(Continued)

FOREIGN PATENT DOCUMENTS

| CN | 1653743 A | 8/2005 |
|---|---|---|
| CN | 1898621 A | 1/2007 |

(Continued)

OTHER PUBLICATIONS

The World Intellectual Property Organization (WIPO) International Search Report for PCT/CN2018/075221 dated Apr. 23, 2018 5 Pages.

(Continued)

*Primary Examiner* — Brandon S Hoffman
(74) *Attorney, Agent, or Firm* — Anova Law Group, PLLC

(57) ABSTRACT

A method for content delivery network (CDN) inter-node encryption by a CDN node includes receiving a symmetric key set and a key index from a key center, determining a key from the symmetric key set according to the key index, and performing encryption and decryption processing using the key when performing Hyper Text Transfer Protocol (HTTP) data transmission with another CDN node.

18 Claims, 2 Drawing Sheets

(56) References Cited

U.S. PATENT DOCUMENTS

| | | | |
|---|---|---|---|
| 2003/0219129 A1 | 11/2003 | Whelan et al. | |
| 2005/0226420 A1 | 10/2005 | Makela et al. | |
| 2007/0124603 A1 | 5/2007 | Masato et al. | |
| 2010/0088505 A1* | 4/2010 | Coppola | H04L 63/10 |
| | | | 713/153 |
| 2012/0216034 A1 | 8/2012 | Chen et al. | |
| 2012/0275597 A1* | 11/2012 | Knox | H04N 21/8586 |
| | | | 380/210 |
| 2012/0297192 A1 | 11/2012 | Coppola et al. | |
| 2014/0310527 A1 | 10/2014 | Veugen et al. | |
| 2016/0066354 A1 | 3/2016 | Oba et al. | |
| 2016/0080340 A1 | 3/2016 | Oba et al. | |
| 2016/0165280 A1* | 6/2016 | Watanabe | H04N 21/26613 |
| | | | 725/31 |

FOREIGN PATENT DOCUMENTS

| | | |
|---|---|---|
| CN | 101009553 A | 8/2007 |
| CN | 101473588 A | 7/2009 |
| CN | 1653743 B | 8/2010 |
| CN | 101848401 A | 9/2010 |
| CN | 102217225 A | 10/2011 |
| CN | 102238002 A | 11/2011 |
| CN | 102281136 A | 12/2011 |
| CN | 103152733 A | 6/2013 |
| CN | 105141636 A | 12/2015 |
| CN | 105743637 A | 7/2016 |
| CN | 105933318 A | 9/2016 |
| CN | 105991635 A | 10/2016 |
| CN | 106302422 A | 1/2017 |
| CN | 106341417 A | 1/2017 |

OTHER PUBLICATIONS

Intellectual Property Office of Singapore The Search Report and Written Opinion for Application No. 112019072330 dated Apr. 16, 2020 11 pages.

* cited by examiner

METHOD, DEVICE, MEDIUM AND APPARATUS FOR CDN INTER-NODE ENCRYPTION

CROSS-REFERENCE TO RELATED APPLICATIONS

The present application is a national stage entry under 35 U.S.C. § 371 of International Application No. PCT/CN2018/075221, filed on Feb. 5, 2018, which claims priority to Chinese Patent Application No. 201710069825.2 filed to China National Intellectual Property Administration on Feb. 8, 2017 and entitled "METHOD, SYSTEM AND DEVICE FOR CDN INTER-NODE ENCRYPTION", the entire contents of both of which are hereby incorporated by reference.

TECHNICAL FIELD OF THE PRESENT INVENTION

Embodiments of the present invention relate to but are not limited to the communication field, and in particular to a method, system, device, medium and apparatus for CDN inter-node encryption.

BACKGROUND OF THE PRESENT INVENTION

With the increasing proportion of security-oriented HTTP channels (Hyper Text Transfer Protocol over Secure Socket Layer, HTTPS) applied in network applications, more and more websites are migrated to HTTPS. For a Content Delivery Network (CDN) responsible for infrastructures in the Internet, how to efficiently provide full-link encryption becomes a difficult problem. CDN nodes mostly adopt a multi-level cache mechanism, and the CDN nodes include edge nodes and parent nodes classified according to geographical locations of large areas. The HTTPS for full link means that all links among clients, edge nodes, parent nodes and source stations employ HTTPS communication mode. Since both the links from the clients to the edge nodes and the links from the parent nodes to the origin server involve the communication with a third party, optimization means are limited. Particularly, it is also necessary to implement a complete HTTPS process between the edge node and the parent node. Consequently, the loads on nodes at both ends participating in operation are relatively high.

SUMMARY OF THE PRESENT INVENTION

The following provides a general summary of the theme described in detail herein.

The general summary is not intended to limit the protection scope of the appended claims.

In order to solve the above technical problem, the embodiments of the present invention provide a method, system, device, medium and apparatus for CDN inter-node encryption.

An embodiment of the present invention provides a method for CDN inter-node encryption, including:

generating a symmetric key set and a key index by a key center, and sending the symmetric key set and the key index to each Content Delivery Network (CDN) node; and receiving, by the CDN node, the symmetric key set and the key index from the key center, determining a key from the symmetric key set according to the key index, and using the key to perform encryption and decryption processing when performing Hyper Text Transfer Protocol (HTTP) data transmission with other CDN nodes.

The method is further featured by:

the sending, by the key center, the symmetric key set and the key index to each CDN node includes: sending the symmetric key set and the key index to each CDN node through an encrypted channel.

The method is further featured by:

the using, by the CDN node, the key to perform encryption and decryption processing when performing HTTP data transmission with other CDN nodes includes: when the CDN node is an edge node, using the key to encrypt an HTTP request, sending the encrypted HTTP request to a parent node, and using the key to decrypt an HTTP response after receiving the HTTP response from the parent node; and/or, when the CDN node is a parent node, after receiving an HTTP request from an edge node, using the key to decrypt the HTTP request, using the key to encrypt an HTTP response and sending the encrypted HTTP response to the edge node.

The method is further featured by:

the generating a symmetric key set and a key index by a key center, and sending the symmetric key set and the key index to each CDN node includes:

generating, by the key center, the key index at a first time interval randomly or according to a preset algorithm, and sending the generated key index to the CDN nodes; and, generating, by the key center, the symmetric key set at a second time interval randomly or according to a preset algorithm, and sending the generated symmetric key set to the CDN nodes, wherein the second time interval is greater than the first time interval; or generating, by the key center, the key index at a first time interval randomly or according to a preset algorithm, and sending the generated key index to the CDN nodes; and, generating, by the key center, the symmetric key set at a second time interval randomly or according to a preset algorithm and generating the key index at a second time interval randomly or according to a preset algorithm, and sending the generated symmetric key set and key index to the CDN nodes, wherein the second time interval is greater than the first time interval.

The method is further featured by:

the key index has a range of [x,y], wherein both x and y are integers and the number of symmetric keys in the symmetric key set is obtained by adding one to a difference between y and x.

An embodiment of the present invention provides a device for CDN inter-node encryption, applied to a key center, including a generation module and a sending module;

the generation module is configured to generate a symmetric key set and a key index; and the sending module is configured to send the key set generated by the generation module to each CDN node and further configured to send the key index generated by the generation module to each CDN node.

The device is further featured by:

the sending module is further configured to send the symmetric key set and the key index to each CDN node through an encrypted channel.

The device is further featured by:

the generation module is further configured to generate the key index at a first time interval randomly or according to a preset algorithm, and generate the symmetric key set at a second time interval randomly or according to a preset algorithm, wherein the second time interval is greater than the first time interval; or, the generation module is further configured to generate the key index at a first time interval randomly or according to a preset algorithm, and generate the symmetric key set at a second time interval randomly or according to a preset algorithm and generate the key index at a second time interval randomly or according to a preset algorithm, wherein the second time interval is greater than the first time interval.

An embodiment of the present invention provides a device for CDN inter-node encryption, applied to a CDN node, including a receiving module and an encryption processing module;

the receiving module is configured to receive a key set from a key center and further configured to receive a key index from the key center; and the encryption processing module is configured to determine a key from the symmetric key set according to the key index and use the key to perform encryption and decryption processing when performing HTTP data transmission with other CDN nodes.

The device is further featured by:

the encryption processing module is further configured to: when the CDN node is an edge node, use the key to encrypt an HTTP request, send the encrypted HTTP request to a parent node, and use the key to decrypt an HTTP response after receiving the HTTP response from the parent node; and, the encryption processing module is further configured to: when the CDN node is a parent node, use the key to decrypt the HTTP request after receiving an HTTP request from an edge node, and, use the key to encrypt an HTTP response and send the encrypted HTTP response to the edge node.

An embodiment of the present invention further provides a computer-readable storage medium stored with computer programs that, when executed by a processor, implements the steps in the method described above.

An embodiment of the present invention further provides a computer apparatus, including a memory, a processor and computer programs that are stored on the memory and can be run on the processor, the processor implementing the steps in the method described above when executing the programs.

The embodiments of the present invention skip the HTTPS handshake process that consumes mostly and utilize the controllable characteristics of both end nodes to directly use the symmetric key, realize a lightweight encryption process, achieve the same encryption effect as a standard HTTPS, reduce encryption overhead between CDN edge nodes and parent nodes and reduce loads on the servers at both ends. The present invention also employs a mechanism for randomly generating and periodically and dynamically updating symmetric keys, which are more secure than public keys and corresponding private keys in the certificates used by conventional HTTPS.

BRIEF DESCRIPTION OF THE DRAWINGS

The drawings described herein are used for providing further understanding of the embodiments of the present invention and constitute a part of the present application. Illustrative embodiments of the present invention and descriptions thereof are used for explaining the embodiments of the present invention, rather than constituting any inappropriate limitations to the embodiments of the present invention. In the drawings.

DETAILED DESCRIPTION OF THE PRESENT INVENTION

Now, the embodiments of the present invention will be further described by specific implementations with reference to the drawings.

Figure 1:
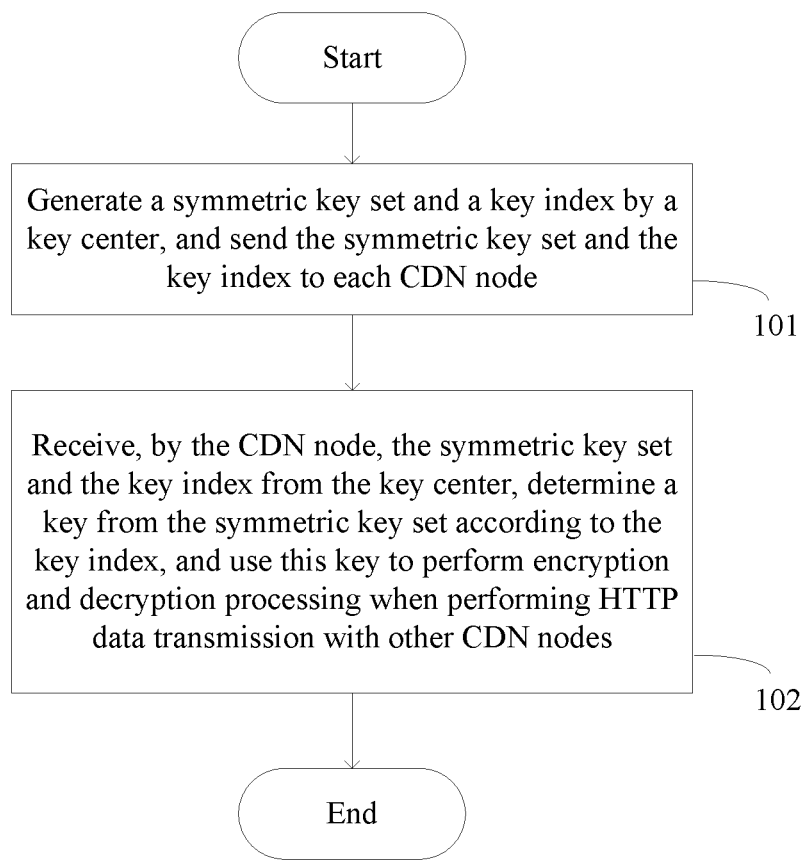
FIG. 1 is flowchart of a method for CDN inter-node encryption according to an embodiment.

FIG. 1 is a flowchart of a method for CDN inter-node encryption according to an embodiment. The method includes the following steps.

Step 101: A key center generates a symmetric key set and a key index and sends the key set and the key index to each CDN node.

Step 102: The CDN node receives the symmetric key set and the key index from the key center, determines a key from the symmetric key set according to the key index, and uses this key to perform encryption and decryption processing when performing HTTP data transmission with other CDN nodes.

Wherein:

in the step 101, the symmetric key set is stored in a memory of the key center but not in a fixed storage medium, so that the security of keys can be improved.

In the step 101, the key center sending the symmetric key set and the key index to each CDN node includes: sending the symmetric key set and the key index to each CDN node through an encrypted channel.

In the step 101, the key center generates a key index at a first time interval randomly or according to a preset algorithm and sends the generated key index to the CDN nodes, wherein a typical sending approach is synchronously sending the key index to each CDN node; and, the key center generates a symmetric key set at a second time interval randomly or according to a preset algorithm and sends the generated symmetric key set to the CDN nodes, wherein a typical sending approach is synchronously sending the symmetric key set to each CDN node, and the second time interval is greater than the first time interval. Or, the key center generates a key index at a first time interval randomly or according to a preset algorithm and sends the generated key index to the CDN nodes; and, the key center generates a symmetric key set at a second time interval randomly or according to a preset algorithm, generates a key index randomly or according to a preset algorithm and sends the generated symmetric key set and key index to the CDN nodes, wherein the second time interval is greater than the first time interval.

The applicant of the present invention considers that both sides of the communication between an edge node and a parent node are computing facilities that can be controlled by the CDN manufacturer, it is important to optimize the communication between the two types of nodes. In the step 102, the CDN node using this key to perform encryption and decryption processing when performing HTTP data transmission with other CDN nodes includes: when the CDN node is an edge node, using the key to encrypt an HTTP request, sending the encrypted HTTP request to a parent node, and using the key to decrypt an HTTP response after receiving the HTTP response from the parent node; and/or, when the CDN node is a parent node, after receiving an HTTP request from an edge node, using the key to decrypt the HTTP request, using the key to encrypt an HTTP response and sending the encrypted HTTP response to the edge node.

In this method, the key index has a range of [x,y], wherein both x and y are integers and the number of symmetric keys in the symmetric key set is obtained by adding one to a difference between y and x. For example, the key index has a range of [0,(n−1)], wherein n is the number of symmetric keys in the symmetric key set. For another example, the key index has a range of [1,n], wherein n is the number of symmetric keys in the symmetric key set.

In the embodiments of the present invention, a system for CDN inter-node encryption includes a key center and a CDN node.

The key center is configured to generate a symmetric key set and a key index and sends the key set and the key index to each CDN node.

The CDN node is configured to determine, from the symmetric key set, a key according to the index acquired from the key center and use this key to perform encryption and decryption processing when performing HTTP data transmission with other CDN nodes.

Figure 2:
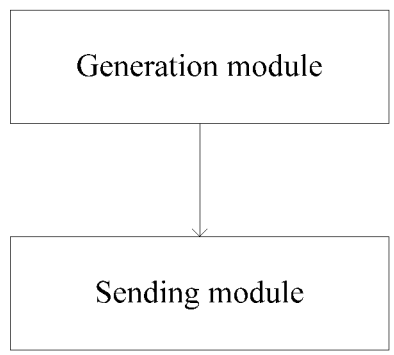
FIG. 2 is a structural diagram of a device for CDN inter-node encryption, applied to a key center, according to an embodiment.

FIG. 2 is a structural diagram of a device for CDN inter-node encryption, which is applied to a key center. The device includes a generation module and a sending module.

The generation module is configured to generate a symmetric key set and a key index.

The sending module is configured to send the key set generated by the generation module to each CDN node and further configured to send the key index generated by the generation module to each CDN node.

Wherein:

the sending module is specifically configured to send the key set and the key index to each CDN node through an encrypted channel.

The generation module is further configured to generate a key index at a first time interval randomly or according to a preset algorithm, and generate a symmetric key set at a second time interval randomly or according to a preset algorithm, wherein the second time interval is greater than the first time interval; or, the generation module is further configured to generate a key index at a first time interval randomly or according to a preset algorithm, and generate a symmetric key set at a second time interval randomly or according to a preset algorithm and generate a key index randomly or according to a preset algorithm, wherein the second time interval is greater than the first time interval.

Figure 3:
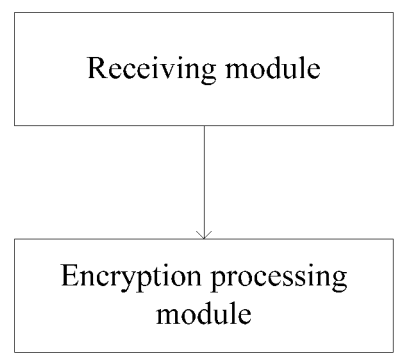
FIG. 3 is a structural diagram of a device for CDN inter-node encryption, applied to a CDN node, according to an embodiment.

FIG. 3 is a structural diagram of a device for CDN inter-node encryption, which is applied to a CDN node. The device includes a receiving module and an encryption processing module.

The receiving module is configured to receive a key set from a key center and further configured to receive a key index from the key center.

The encryption processing module is configured to determine a key from the symmetric key set according to the key index and use the key to perform encryption and decryption processing when performing HTTP data transmission with other CDN nodes.

The encryption processing module is further configured to: when the CDN node is an edge node, use the key to encrypt an HTTP request, send the encrypted HTTP request to a parent node, and use the key to decrypt an HTTP response after receiving the HTTP response from the parent node; and, the encryption processing module is further configured to: when the CDN node is a parent node, use the key to decrypt the HTTP request after receiving an HTTP request from an edge node, and, use the key to encrypt an HTTP response and send the encrypted HTTP response to the edge node.

An embodiment of the present invention further provides a computer-readable storage medium stored with computer programs that, when executed by a processor, implement the steps in the method described above.

An embodiment of the present invention further provides a computer apparatus, including a memory, a processor, and computer programs that are stored on the memory and can be run on the processor. When executing the programs, the processor implements the steps in the method described above.

Specific Embodiments

Step 1): A key center randomly generates a symmetric key set K, and this symmetric key set contains a plurality of symmetric keys.

Step 2): A symmetric key center synchronously sends the symmetric key set K to all edge nodes and parent nodes through an encrypted channel.

Step 3): The symmetric key center randomly generates a symmetric key index I, and the index has a range of [0,(n−1)], wherein n is the number of symmetric keys in the key set K.

Step 4): The symmetric key center synchronously sends the symmetric key index I to all edge nodes and parent nodes through an encrypted channel.

Step 5): When an edge node sends an HTTP request to a parent node, K[I] is used as a key to encrypt the HTTP request.

Step 6): When the parent node receives the encrypted HTTP request, K[I] is also used as a key to decrypt data so as to obtain the original text of the HTTP request.

Step 7): When the parent node sends an HTTP response to the edge node, K[I] is used as a key to encrypt the HTTP response.

Step 8): When the edge node receives the encrypted HTTP response, K[I] is also used as a key to decrypt data so as to obtain the original text of the HTTP response.

Step 9): The symmetric key center re-executes the steps 3) and 4) at a time interval T1 to generate a new key index I and synchronously sends the new key index I to all edge nodes and parent nodes.

Step 10): The symmetric key center re-executes the steps 1) and 2) at a time interval T2 (T2>T1) to generate a new key set K and synchronously sends the new key set K to all edge nodes and parent nodes. Or, the symmetric key center re-executes the steps 1), 2), 3) and 4) at a time interval T2 (T2>T1) to generate a new key set K and a new key index I and synchronously sends the new key set K and the new key index I to all edge nodes and parent nodes.

The embodiments of the present invention skip the HTTPS handshake process that consumes mostly and utilize the controllable characteristics of both end nodes to directly use the symmetric key, realize a lightweight encryption process, achieve the same encryption effect as a standard HTTPS, reduce encryption overhead between CDN edge nodes and parent nodes and reduce loads on the servers at both ends. The embodiments of the present invention also employ a mechanism for randomly generating and periodically and dynamically updating symmetric keys, which are more secure than public keys and corresponding private keys in the certificates used by conventional HTTPS.

It should be understood by a person of ordinary skill in the art that, modifications or equivalent replacements may be made to the technical solutions in the embodiments of the present invention without departing from the spirit and scope of the technical solutions in the embodiments of the present invention, and these modifications or equivalent replacements shall fall into the scope of the appended claims.

It should be understood by a person of ordinary skill in the art that, all or some of steps in the methods disclosed herein and the functional modules/units in the systems and devices disclosed herein may be implemented as software, firmware, hardware and proper combinations thereof. In the hardware implementations, the division of the functional modules/units mentioned in the foregoing descriptions does not necessarily correspond to the division of the physical components. For example, one physical component may have a plurality of functions, or one function or step may be cooperatively executed by a plurality of physical components. Some or all of components may be implemented as software executed by a processor such as a digital signal processor or a microprocessor, or hardware, or integrated circuits such as application-specific integrated circuits. The software may be distributed on a computer-readable medium. The computer-readable medium may include a computer storage medium (or a non-temporary medium) and a communication medium (or a temporary medium). As known to a person of ordinary skill in the art, the computer storage medium includes volatile and nonvolatile, removable and non-removable mediums implemented in any method or technology for storing information (such as computer-readable instructions, data structures, program modules or other data). The computer storage medium includes, but not limited to: RAM, ROM, EEPROM, a flash memory or other memory technologies, CN-ROM, a Digital Versatile Disc (DVD) or other optical disc storages, a magnetic cassette, a magnetic tape, a magnetic disc memory or other magnetic storage devices, or any other medium that may be used for storing desirable information and may be accessed by a computer. In addition, as known to a person of ordinary skill in the art, the communication medium typically includes computer-readable instructions, data structures, program modules or other data such as carriers or modulation data signals in other transmission mechanisms, and may include any information delivery medium.

INDUSTRIAL APPLICABILITY

The embodiments of the present invention skip the HTTPS handshake process that consumes mostly and utilize the controllable characteristics of both end nodes to directly use the symmetric key, realize a lightweight encryption process, achieve the same encryption effect as a standard HTTPS, reduce encryption overhead between CDN edge nodes and parent nodes and reduce loads on the servers at both ends.

What is claimed is:

1. A method for content delivery network (CDN) inter-node encryption comprising:
   receiving, by a CDN node, a symmetric key set and a key index from a key center;
   determining, by the CDN node, a key from the symmetric key set according to the key index; and
   performing, by the CDN node, encryption and decryption processing using the key when performing Hyper Text Transfer Protocol (HTTP) data transmission with another CDN node;
   wherein the symmetric key set is stored in a memory of the key center but not in a fixed storage medium; and
   wherein receiving the symmetric key set and the key index from the key center includes:
      receiving, at a first time interval, the key index, the key index being generated randomly or according to a preset index generation algorithm; and
      receiving, at a second time interval greater than the first time interval:
         the symmetric key set, the symmetric key set being generated randomly or according to a preset key generation algorithm, or
         the symmetric key set and the key index.

2. The method according to claim 1, wherein:
   receiving the symmetric key set and the key index comprises receiving the symmetric key set and the key index through an encrypted channel.

3. The method according to claim 1, wherein:
   the CDN node is an edge node and the other CDN node is a parent node; and
   performing the encryption and decryption processing using the key includes:
      encrypting an HTTP request using the key;
      sending the encrypted HTTP request to the parent node;
      receiving an HTTP response from the parent node; and
      decrypting the HTTP response using the key.

4. The method according to claim 1, wherein:
   the CDN node is a parent node and the other CDN node is an edge node; and
   performing the encryption and decryption processing using the key includes:
      receiving an HTTP request from the edge node;
      decrypting the HTTP request using the key;
      encrypting an HTTP response using the key; and
      sending the encrypted HTTP response to the edge node.

5. The method according to claim 1, wherein:
   the key index has a range of [x,y], x and y being integers; and
   a number of symmetric keys in the symmetric key set equals one plus a difference between y and x.

6. The method according to claim 1, wherein receiving the symmetric key set and the key index from the key center includes:
   receiving, at the first time interval, the key index that is generated randomly or according to the preset index generation algorithm; and
   receiving, at the second time interval greater than the first time interval, the key index and the symmetric key set that is generated randomly or according to the preset key generation algorithm.

7. An apparatus for content delivery network (CDN) inter-node encryption comprising:
   a memory storing computer programs; and
   a processor configured to execute the computer programs to:
      generate, at a first time interval, a key index randomly or according to a preset index generation algorithm;
      generate, at a second time interval greater than the first time interval:
         a symmetric key set randomly or according to a preset key generation algorithm, or
         the symmetric key set and the key index; and
      send the symmetric key set and the key index to one or more CDN nodes;
   wherein the symmetric key set is stored in a memory of a key center but not in a fixed storage medium.

8. The apparatus according to claim 7, wherein the processor is further configured to execute the computer programs to:

send the symmetric key set and the key index to each of the one or more CDN nodes through an encrypted channel.

9. The apparatus according to claim 8, wherein:
the key index has a range of [x,y], x and y being integers; and
a number of symmetric keys in the symmetric key set equals one plus a difference between y and x.

10. An apparatus for content delivery network (CDN) inter-node encryption comprising:
a memory storing computer programs; and
a processor configured to execute the computer programs to:
receive a symmetric key set and a key index from a key center;
determine a key from the symmetric key set according to the key index; and
perform encryption and decryption processing using the key when performing Hyper Text Transfer Protocol (HTTP) data transmission with another CDN node;
wherein the symmetric key set is stored in a memory of the key center but not in a fixed storage medium;
wherein, at a first time interval, the key index is generated randomly or according to a preset index generation algorithm; and
wherein at a second time interval greater than the first time interval:
the symmetric key set is generated randomly or according to a preset key generation algorithm, or
the symmetric key set and the key index are generated.

11. The apparatus according to claim 10, wherein the processor is further configured to execute the computer programs to:
encrypt an HTTP request using the key;
send the encrypted HTTP request to the other CDN node;
receive an HTTP response from the other node; and
decrypt the HTTP response using the key.

12. The apparatus according to claim 10, wherein the processor is further configured to execute the computer programs to:
receive an HTTP request from the other CDN node;
decrypt the HTTP request using the key;
encrypt an HTTP response using the key; and
send the encrypted HTTP response to the other CDN node.

13. The apparatus according to claim 10, wherein:
the key index has a range of [x,y], x and y being integers; and
a number of symmetric keys in the symmetric key set equals one plus a difference between y and x.

14. A non-transitory computer-readable storage medium storing computer programs that, when executed by a processor, implement the method according to claim 1.

15. A non-transitory computer-readable storage medium storing computer programs that, when executed by a processor, implement the method according to claim 2.

16. A non-transitory computer-readable storage medium storing computer programs that, when executed by a processor, implement the method according to claim 3.

17. A non-transitory computer-readable storage medium storing computer programs that, when executed by a processor, implement the method according to claim 4.

18. A non-transitory computer-readable storage medium storing computer programs that, when executed by a processor, implement the method according to claim 5.

* * * * *